(12) United States Patent
Chen et al.

(10) Patent No.: US 7,573,704 B2
(45) Date of Patent: Aug. 11, 2009

(54) MOUNTING APPARATUS FOR EXPANSION CARD OF COMPUTER SYSTEM

(75) Inventors: Yun-Lung Chen, Shenzhen (CN); Da-Long Sun, Shenzhen (CN)

(73) Assignees: Hong Fu Jin Precision Industry (ShenZhen) Co., Ltd., Shenzhen, Guangdong Province (TW); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 472 days.

(21) Appl. No.: 11/308,946

(22) Filed: May 29, 2006

(65) Prior Publication Data

US 2007/0177267 A1 Aug. 2, 2007

(30) Foreign Application Priority Data

Dec. 30, 2005 (CN) .................... 2005 2 0121453 U

(51) Int. Cl.
*H05K 5/00* (2006.01)
*H05K 7/00* (2006.01)
(52) U.S. Cl. ............................. 361/679.32; 361/679.58; 361/752; 361/816
(58) Field of Classification Search ................ 361/683, 361/679.32, 679.58, 752, 816; 312/215
See application file for complete search history.

(56) References Cited

U.S. PATENT DOCUMENTS

| | | | | |
|---|---|---|---|---|
| 5,673,175 A | * | 9/1997 | Carney et al. ............... | 361/686 |
| 5,936,835 A | * | 8/1999 | Astier ........................ | 361/683 |
| 6,138,839 A | * | 10/2000 | Cranston et al. ......... | 211/41.17 |
| 6,278,614 B1 | * | 8/2001 | Beaman et al. ............. | 361/752 |
| 6,480,392 B1 | * | 11/2002 | Jiang .......................... | 361/755 |
| 6,487,070 B2 | * | 11/2002 | Gan ........................... | 361/683 |
| 6,530,629 B2 | * | 3/2003 | Shyr ....................... | 312/223.2 |
| 6,549,398 B2 | | 4/2003 | Chen | |
| 6,625,034 B2 | * | 9/2003 | Davis et al. ................. | 361/759 |
| 6,639,151 B1 | * | 10/2003 | Chen et al. .................. | 174/666 |
| 6,693,800 B1 | * | 2/2004 | Lin et al. .................... | 361/759 |
| 7,054,164 B2 | * | 5/2006 | Shih-Tsung ................ | 361/801 |
| 7,120,032 B2 | * | 10/2006 | Lin et al. .................... | 361/801 |

* cited by examiner

*Primary Examiner*—Jayprakash N Gandhi
*Assistant Examiner*—Quinn Hunter
(74) *Attorney, Agent, or Firm*—Wei Te Chung

(57) ABSTRACT

A mounting apparatus for an expansion card (11) with a shield plate (12) includes a rear plate (10), a locking member (20) and a latch (30). A bent portion (17) extends out of the rear plate for the shield plate being disposed thereon. The locking member is pivotably attached to the bent portion of the rear plate for pressing against the shield plate. The latch is attached to one of the rear plate and the locking member, and capable of being rotated on the rear plate above the bent portion, for preventing the shield plate releasing from between the locking member and the rear plate.

12 Claims, 10 Drawing Sheets

MOUNTING APPARATUS FOR EXPANSION CARD OF COMPUTER SYSTEM

FIELD OF THE INVENTION

The present invention relates to mounting apparatuses, and more particularly to a mounting apparatus for an expansion card of a computer system.

DESCRIPTION OF RELATED ART

In a conventional computer system, a plurality of expansion cards is needed to provide special functions, and requires tight, stable assembly. Usually, a typical mounting apparatus is provided with screws in assembly of the expansion cards. However, this mounting means is very inconvenient.

A mounting apparatus is provided to secure the expansion cards to a computer enclosure of the computer system. The computer enclosure includes a rear panel and a fastener. The rear panel includes an expansion card bracket, a pair of pivot slots, and a convex portion. The bracket defines a plurality of expansion slots adapted for providing access to the expansion cards. The fastener includes a pair of tabs inserted into the pivot slots of the rear panel, and a latch. The latch engages at the convex portion, thereby securing both the fastener and the expansion cards to the bracket of the rear panel. A pin is inserted into the fastener and the bracket, for enhancing the engagement of the fastener with the bracket of the rear panel. The expansion cards are thereby firmly secured to the computer enclosure. This mounting means is an improvement in installation and removal of the expansion cards, but is still inconvenient.

What is needed, therefore, is a mounting apparatus for convenient installation and removal of an expansion card.

SUMMARY OF INVENTION

A mounting apparatus for an expansion card with a shield plate includes a rear plate, a locking member, and a latch. A bent portion extends out of the rear plate for the shield plate being disposed thereon. The locking member is pivotably attached to the bent portion of the rear plate for pressing against the shield plate. The latch is attached to one of the rear plate and the locking member, and capable of being rotated on the rear plate above the bent portion, for preventing the shield plate releasing from between the locking member and the rear plate.

Other advantages and novel features will be drawn from the following detailed description of preferred embodiments with attached drawings, in which:

DETAILED DESCRIPTION

Figure 1:
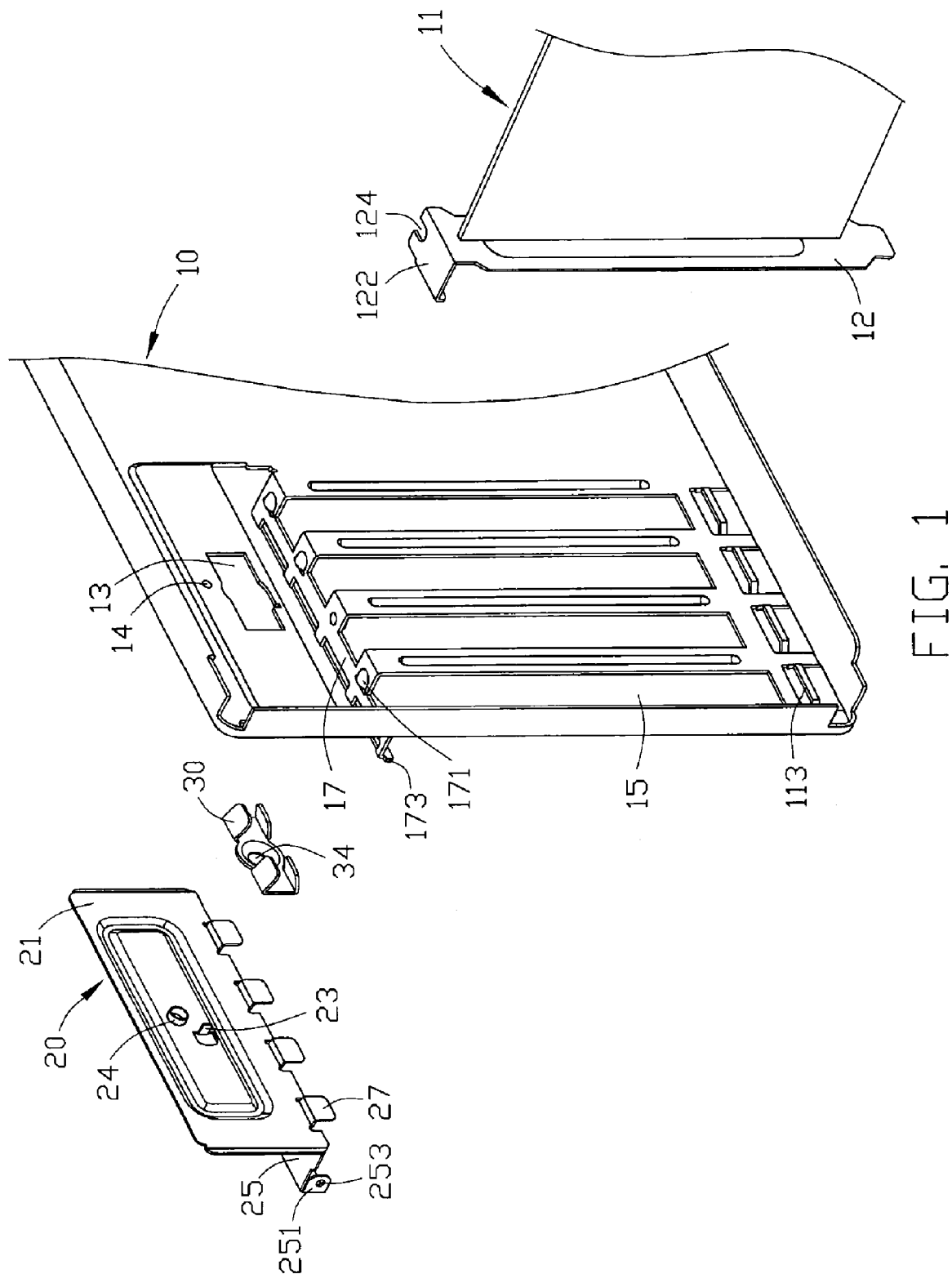
FIG. 1 is an exploded, isometric, cutaway view of a mounting apparatus of a preferred embodiment of the present invention, together with an expansion card, the mounting apparatus including a rear plate of a computer enclosure, a locking member, and a latch.
Figure 2:
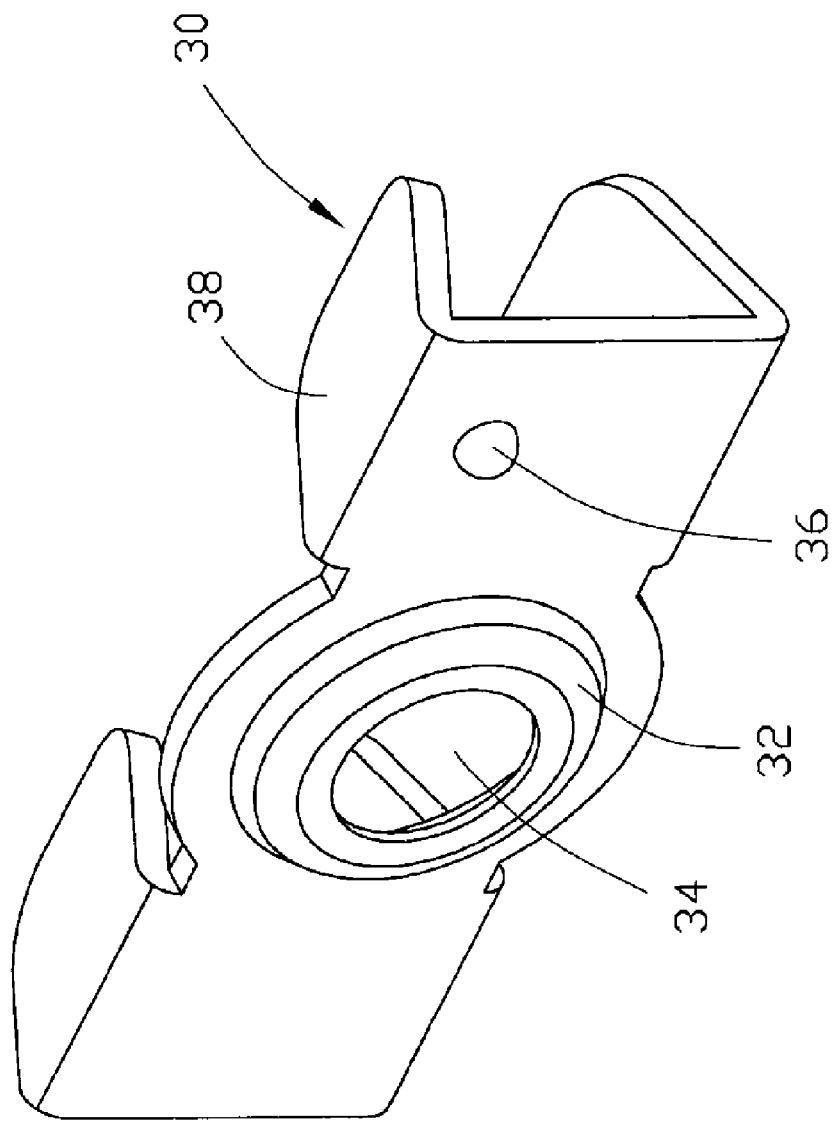
FIG. 2 is an enlarged, isometric view of the latch of FIG. 1, but viewed from another aspect.

Referring to FIG. 1, a mounting apparatus of a preferred embodiment of the present invention, for securing an expansion card 11, includes a rear plate 10 of a computer enclosure, a locking member 20, and a latch 30. The expansion card 11 has a shield plate 12. A supporting portion 122 is perpendicularly bent from a top end of the shield plate 122. A cutout 124 is defined in the supporting portion 122.

The rear plate 10 defines a plurality of elongated slots 15 therein, the slots 15 being parallel to each other. A plurality of strips 113 protrudes in from a bottom portion of the rear plate 10 below the slots 15. A bent portion 17 extends out of the rear plate 10 at a top portion, and the slots 15 extend to the bent portion 17. A protrusion 171 is formed on the bent portion 17 adjacent each slot 15. A shaft 173 is formed on a free edge of the bent portion 17, parallel to the rear plate 10. An opening 13 is defined in the rear plate 10 above the bent portion 17. A positioning hole 14 is defined in the rear plate 10 above the opening 13.

The locking member 20 includes a base wall 25, and a side wall 21 generally perpendicular to the base wall 25. The base wall 25 has a pair of bent tabs 251. Each bent tab 251 defines a pivot hole 253 therein, for receiving the shaft 173 of the rear portion 17 of the rear plate 10. A post 24 protrudes from the side wall 21, and a stop tab 23 is formed on the side wall 21 beside the post 24. A plurality of blocking tabs 27 extends down from a bottom edge of the side wall 21, corresponding to the slots 15 of the rear plate 10.

The latch 30 inserts through the opening 13 of the rear plate 10, and has a convex portion 32. A pivot hole 34 is defined in the convex portion 32 for receiving the post 24 of the locking member 20. A protrusion 36 is formed on the latch 30 for engaging into the positioning hole 14 of the rear plate 10. The latch 30 has two pairs of operating clips 38 for conveniently driving the latch 30.

Figure 3:
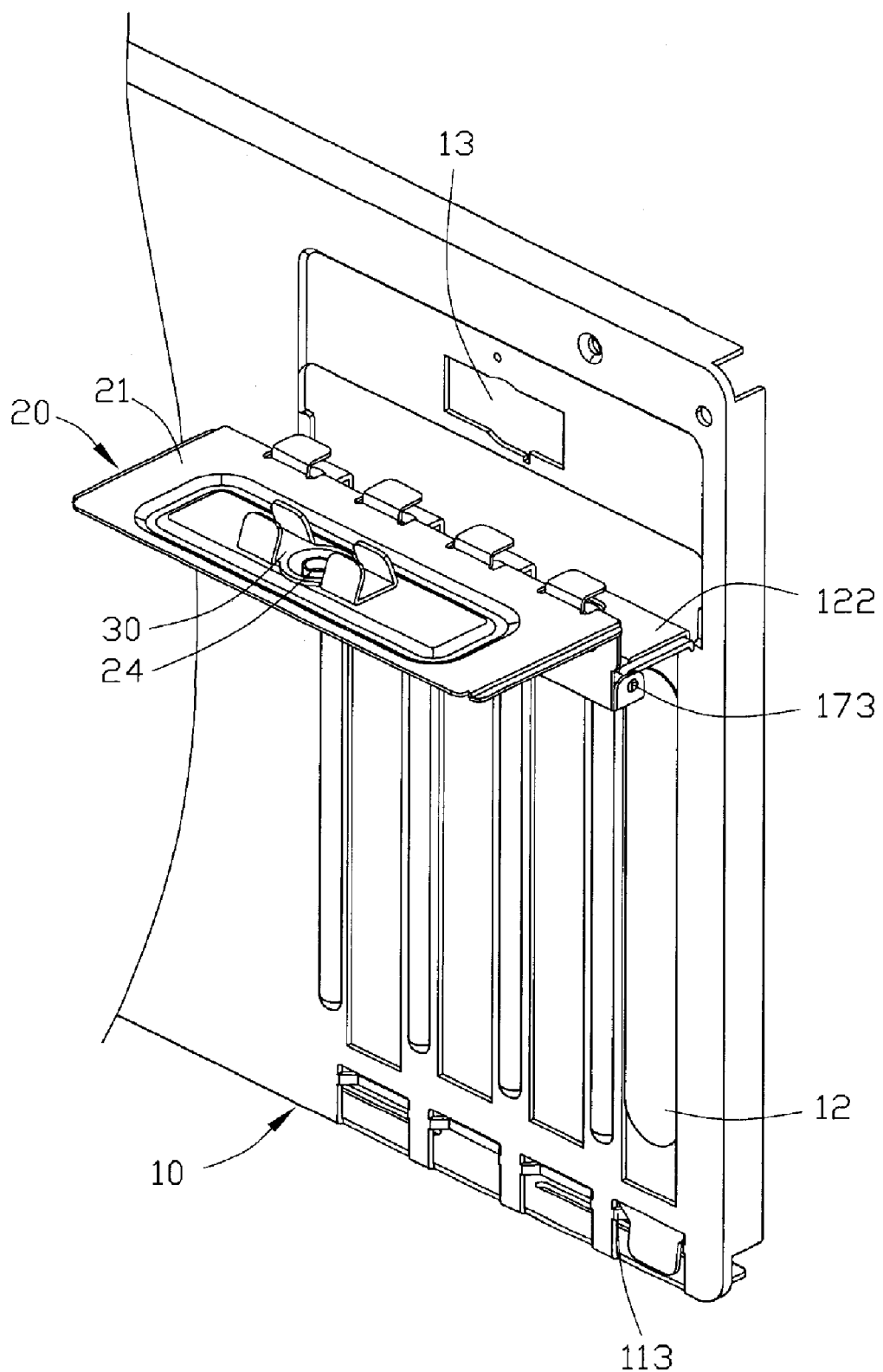
FIG. 3 is an assembled view of the mounting apparatus of FIG. 1, but viewed from another aspect.

Referring also to FIG. 3, before assembly of the expansion card 11, the latch 30 is pivotably secured to the side wall 21 of the locking member 20, with the post 24 engaging in the pivot hole 34. The convex portion 32 of the latch 30 abuts against the side wall 21, a space remains between the latch 30 and the side wall 21, so the latch 30 is capable of being rotated on an inner surface of the rear plate 10 after insertion through the opening 13. The locking member 20 is pivotably attached to the bent portion 17 of the rear plate 10, with the shaft 173 engaging in the pivot holes 253 of the bent tabs 251.

Figure 4:
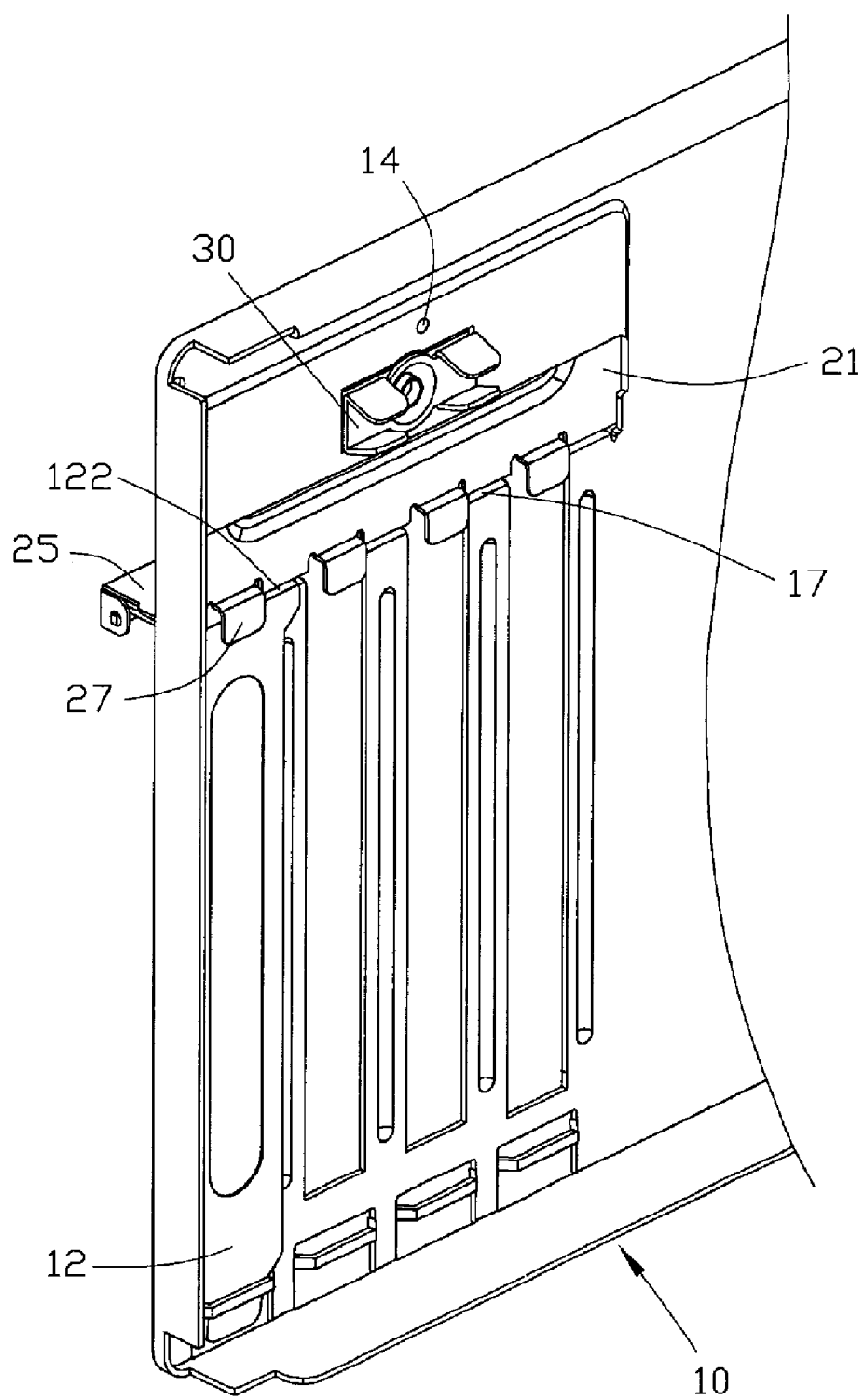
FIG. 4 is an assembled view of FIG. 1, and showing the latch in an unlocked position and omitting the expansion card.
Figure 5:
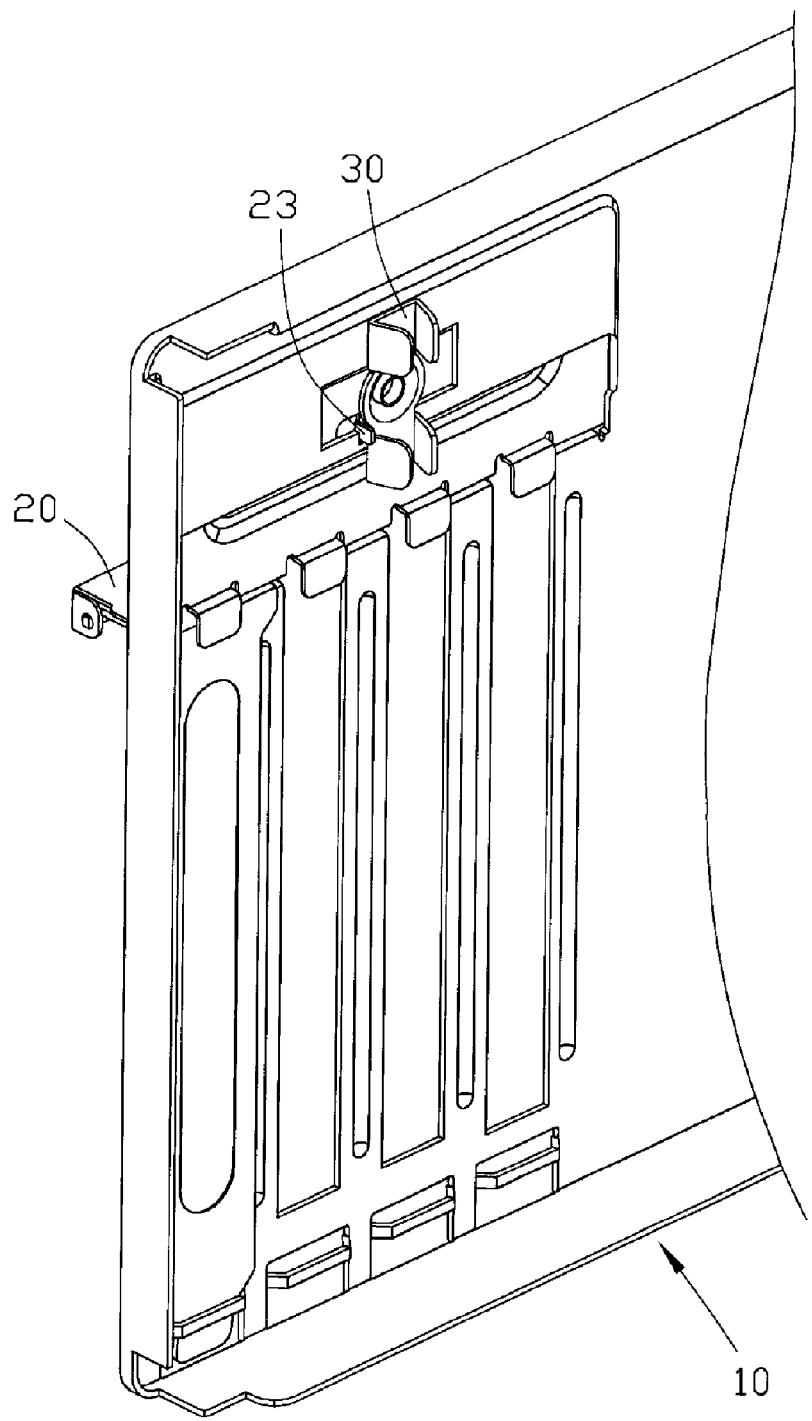
FIG. 5 is similar to FIG. 4, but showing the latch in a locked position.

Referring also to FIGS. 4 and 5, in assembly of the expansion card 11, the latch 30 is in an unlocked position, i.e. a horizontal position, and the stop tab 23 lies below the latch 30. A bottom end of the shield plate 12 is inserted between the strip 113 and the rear plate 10, and the supporting portion 122 depends from the bent portion 17, thereby the shield plate 12 covering the slot 15 of the rear plate 10. The protrusion 171 is engaged in the cutout 124 of the expansion card 11, for positioning the shield plate 12 on the rear plate 10. The latch 30 is inserted through the opening 13. The locking member 20 is rotated up. The supporting portion 122 of the expansion card 12 is sandwiched between the base wall 25 of the locking member 20 and the bent portion 17 of the rear plate 10. The blocking tab 27 abuts against the shield plate 12. The side wall 21 of the locking member 20 abuts an outer surface of the rear plate 10. The latch 30 is rotated clockwise on the inner surface of the rear plate 10 until blocked by the stop tab 23 of the locking member 20. At the same time, the protrusion 36 of the latch 30 is engaged in the positioning hole 14 of the rear plate 10. The latch 30 is located in a locked position, i.e. a vertical position. Thus, the expansion card 11 is stably secured to the rear plate 10 of the computer enclosure.

In disassembly of the expansion card 11, the protrusion 36 of the latch 30 is disengaged from the positioning hole 14 of the rear plate 10 by driving the operating clips 38, and the latch 30 can be thereby rotated counter-clockwise from the locked position to the unlocked position. The latch 30 can then be taken out of the opening 13. The locking member 20 is then rotated down. The supporting portion 122 is released, and the expansion card 11 can be thus taken away from the rear plate 10.

Figure 6:
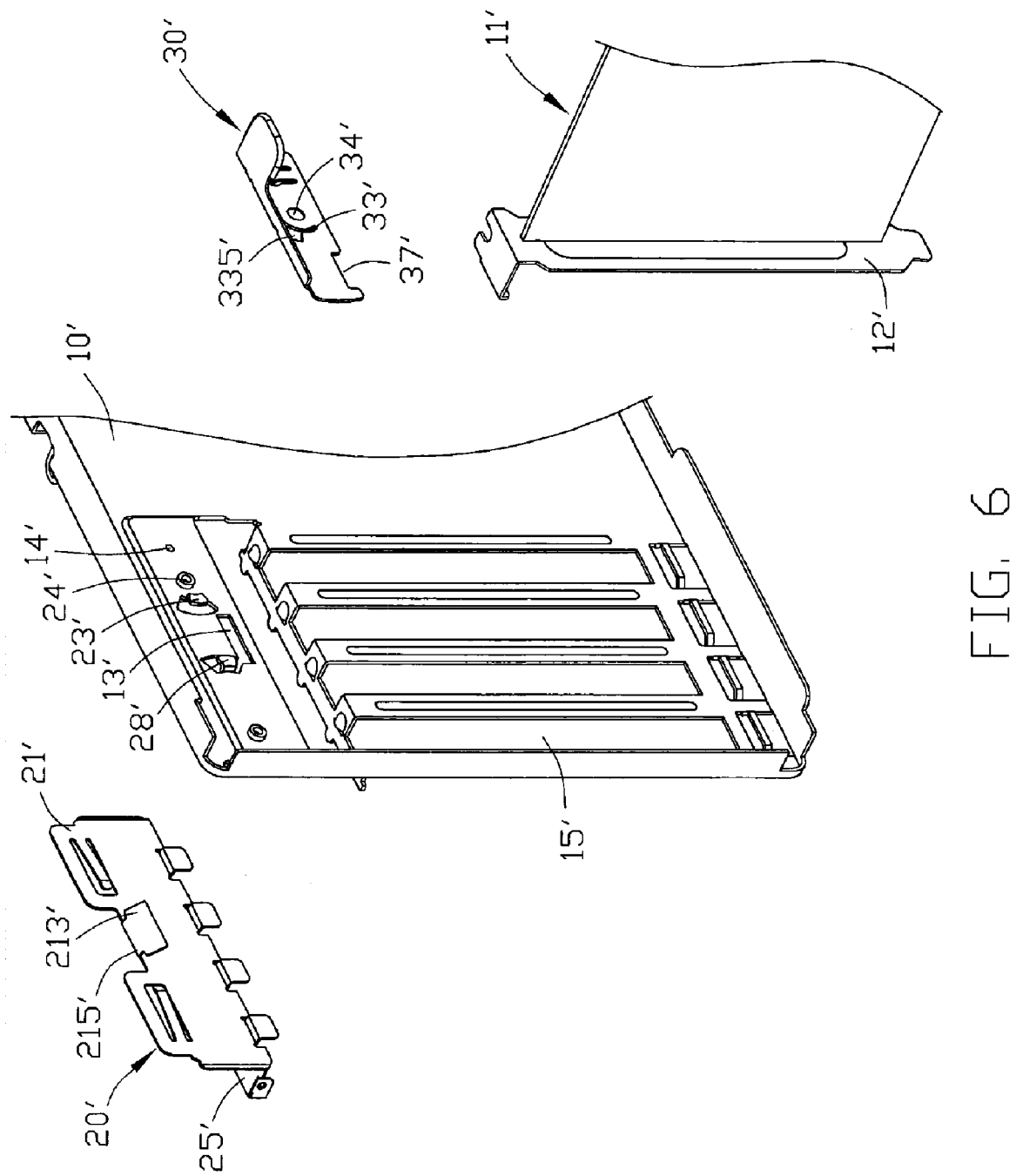
FIG. 6 is an exploded, isometric, cutaway view of a mounting apparatus of an alternative embodiment of the present invention, together with an expansion card, the mounting apparatus including a rear plate of a computer enclosure, a locking member, and a latch.

Referring to FIG. 6, in an alternative embodiment of the present invention, the mounting apparatus includes a rear plate 10', a locking member 20', and a latch 30'.

The rear plate 10' defines an opening 13', and a positioning hole 14' beside the opening 13'. Two L-shaped locating tabs 23', 28' protrude in from the rear plate 10' above the opening 13'. A post 24' protrudes in from the rear plate 10' between the locating tab 23' and the positioning hole 14'.

The locking member 20' includes a side wall 21' and a base wall 25'. A lock clip 213' is formed slanting down from the side wall 21'. The lock clip 213' has a narrow portion 215' connecting with the side wall 21'.

The latch 30' defines a pivot hole 34' therein, for receiving the post 24' of the rear plate 10'. An arc-shaped sliding slot 33' is defined in the latch 30', for the locating tab 23' sliding therein. The sliding slot 33' has a wide portion 335' for the locating tab 23' inserting therethrough. A cutout 37' is defined in the latch 30', having a width generally equal to a width of the narrow portion 215', but smaller than a width of the lock clip 213' of the locking member 20'. A protrusion (not shown) is formed on the latch 30', for engaging in the positioning hole 14'.

Figure 7:
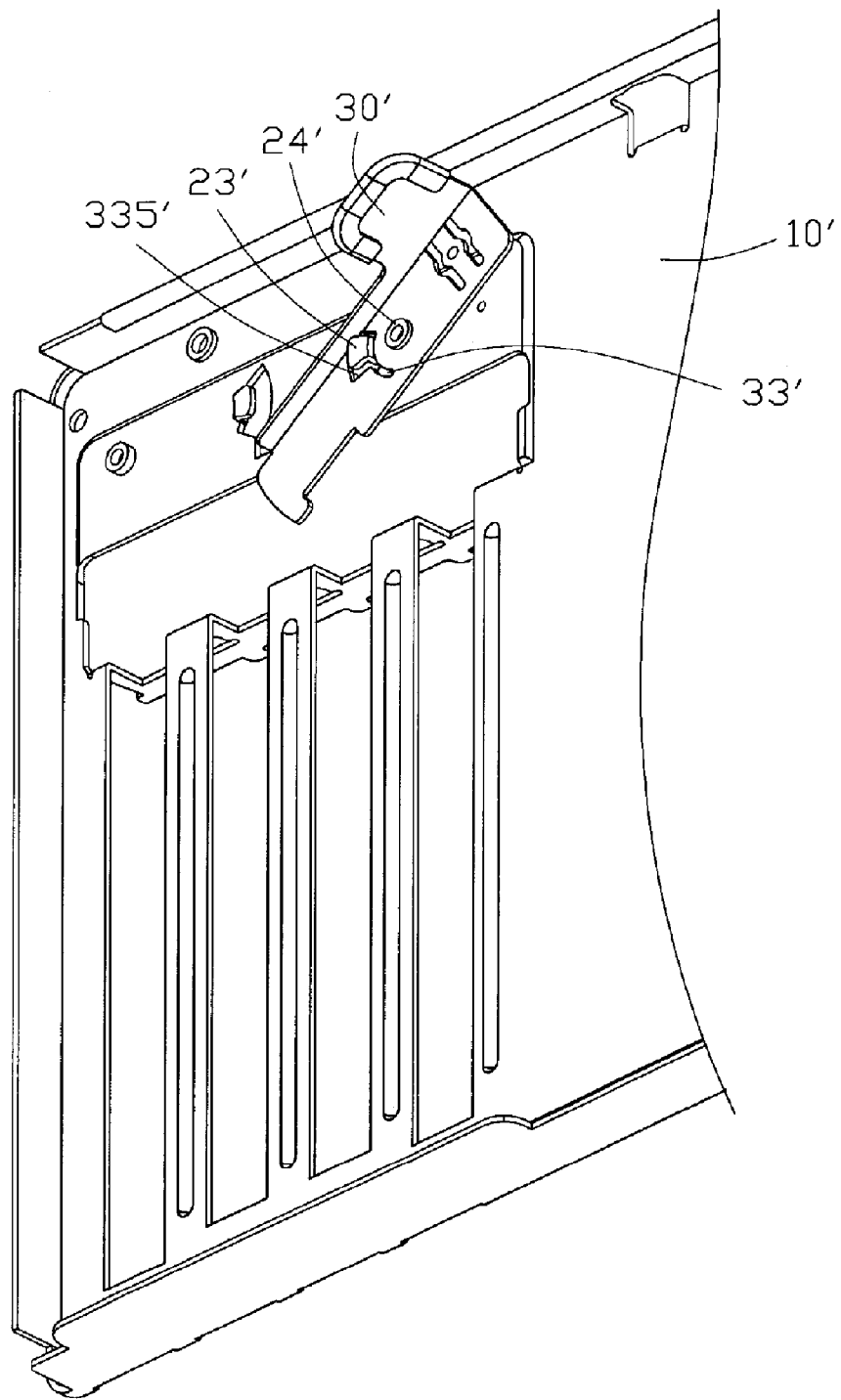
FIG. 7 is an assembled view of the rear plate and the latch of FIG. 6.
Figure 8:
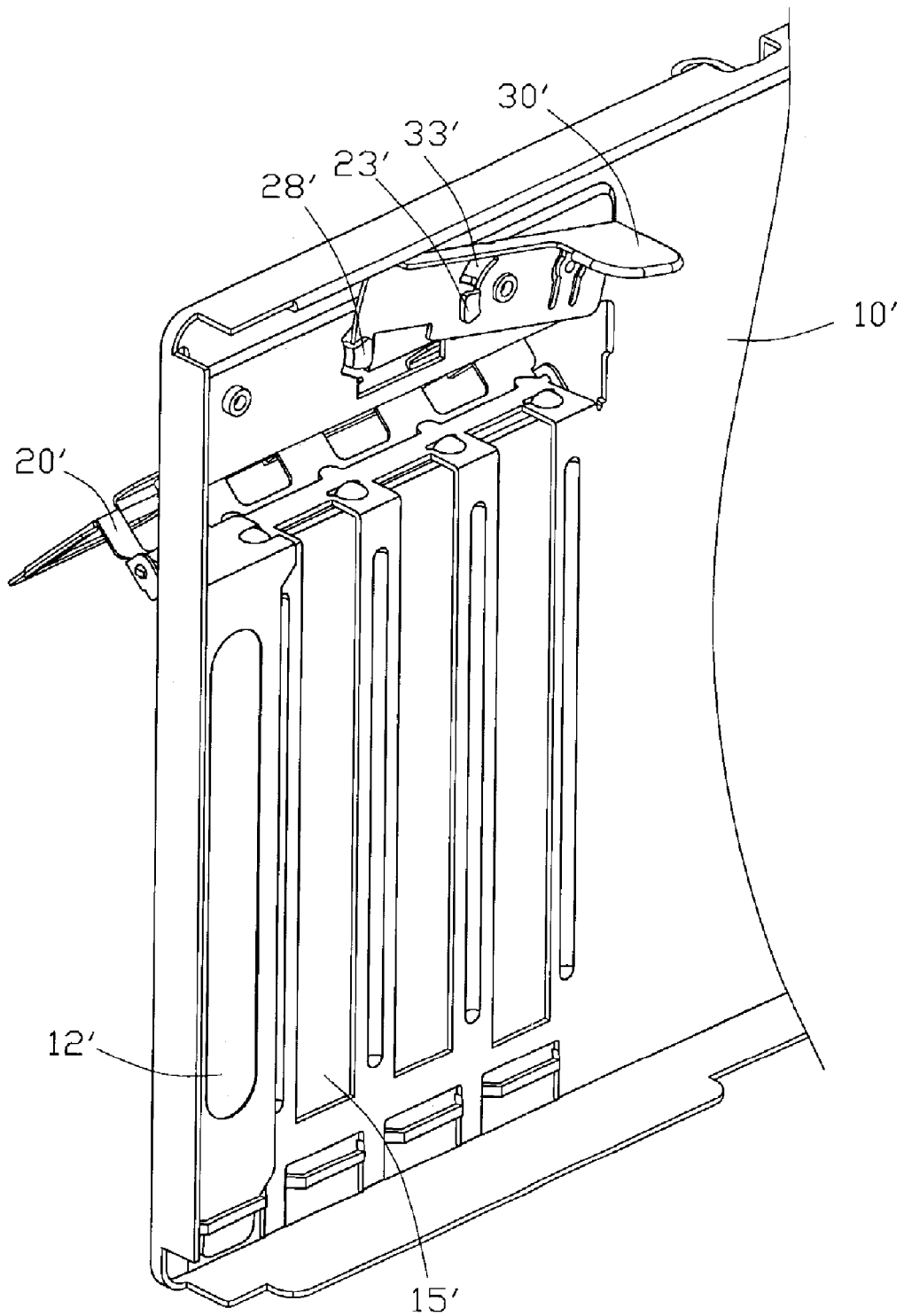
FIG. 8 is an assembled view of FIG. 6, showing the locking member and the latch in an unlocked position, the expansion card being omitted.

Referring also to FIGS. 7 and 8, before assembling the expansion card 11, the locking member 20' is pivotably attached to the rear plate 10'. The wide portion 335' of the sliding slot 33' of the latch 30' aligns with the locating tab 23' of the rear plate 10', and the post 24' of the rear plate 10' aligns with the pivot hole 34' of the latch 30'. The latch 30' is pushed towards the rear plate 10'. The locating tab 23' is inserted into the wide portion 335', and the post 24' is inserted into the pivot hole 34'. The latch 30' is rotated clockwise. The locating tab 23' is slid into the sliding slot 33', and the latch 30' is held between the locating tabs 23', 28. The latch 30' is retained on an inner surface of the rear plate 10'.

Figure 9:
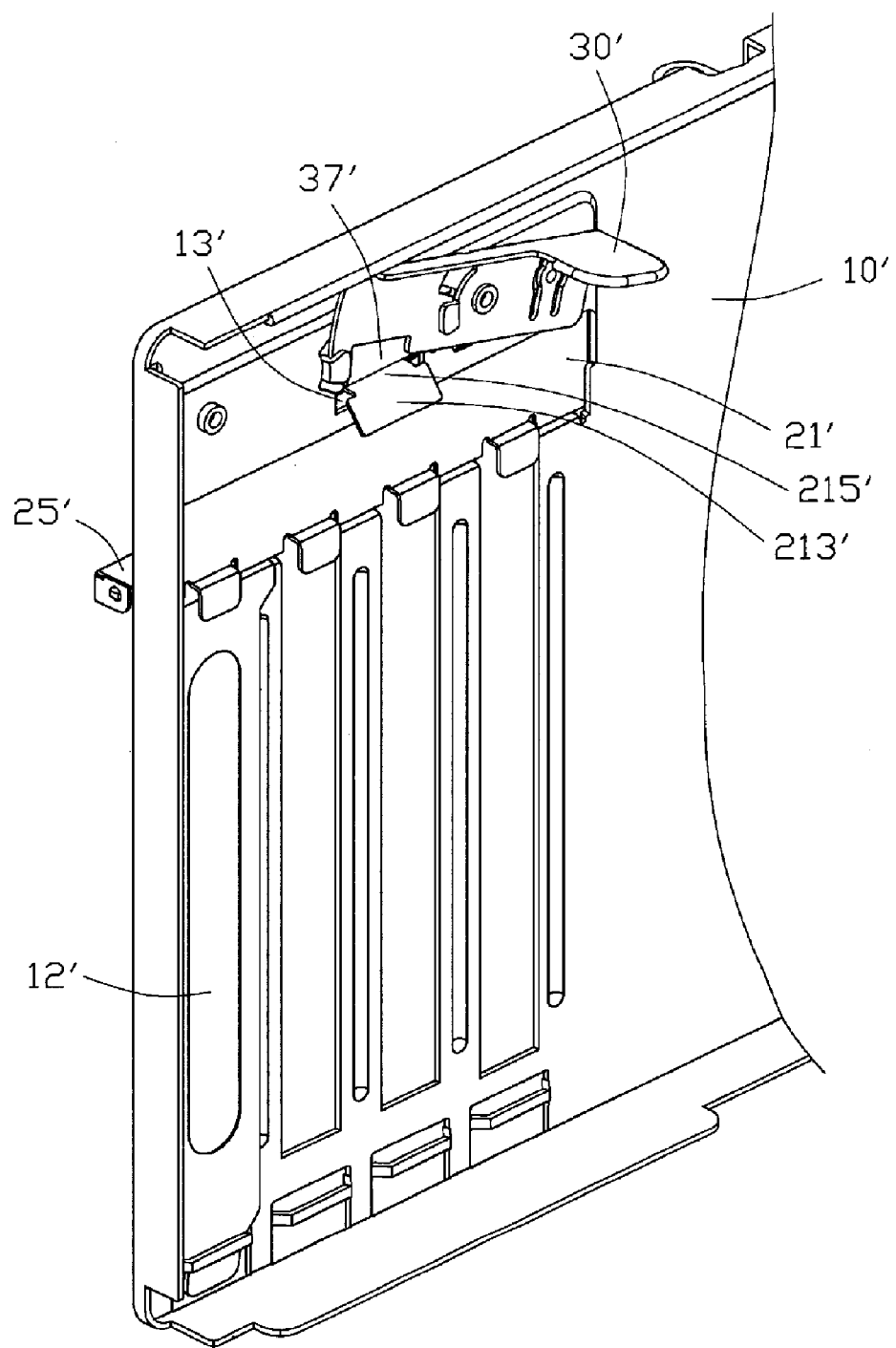
FIG. 9 is similar to FIG. 8, but showing the locking member in a locked position.
Figure 10:
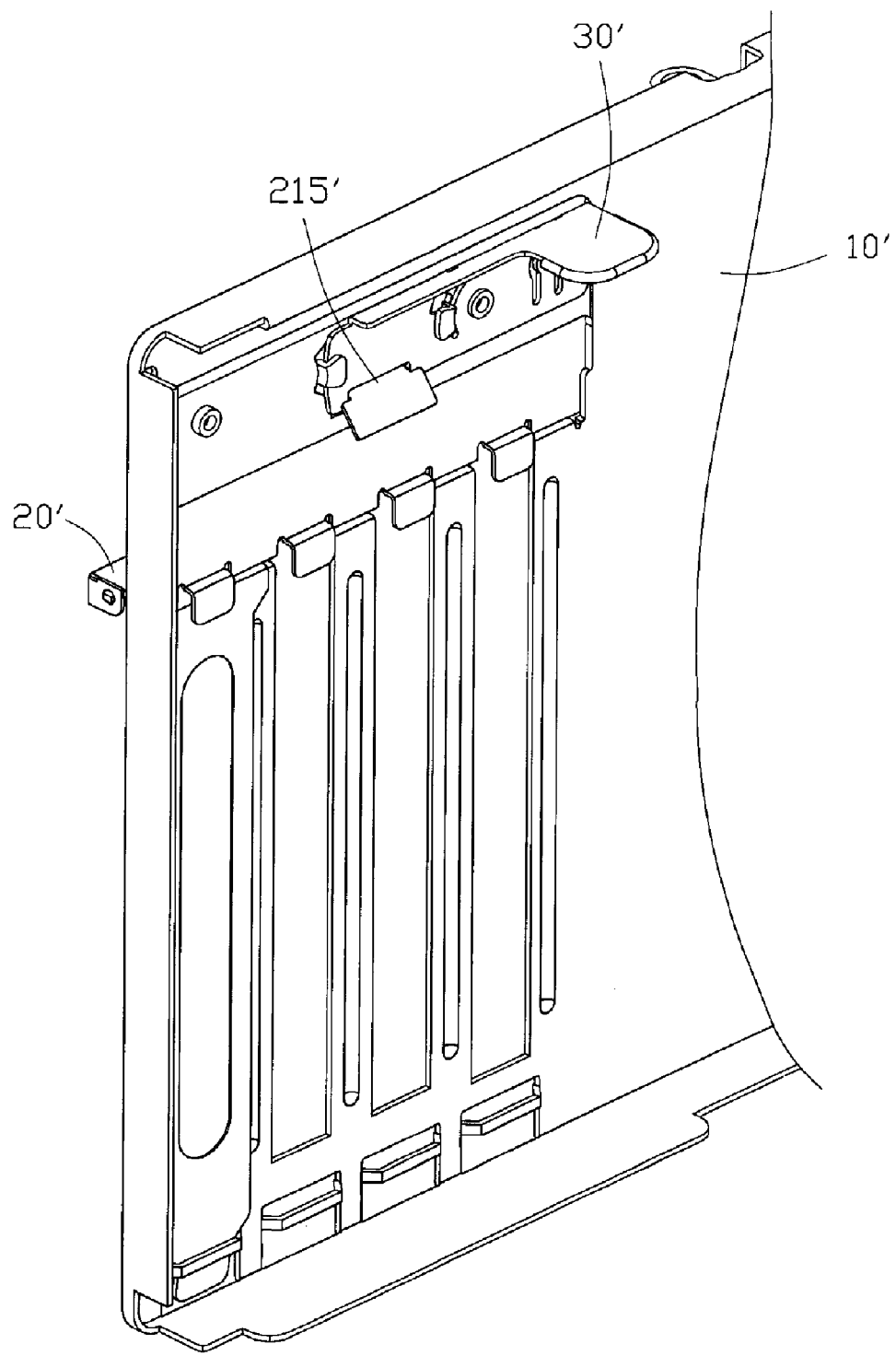
FIG. 10 is similar to FIG. 9, but showing the latch in a locked position.

Referring also FIGS. 8 to 10, in assembly, the expansion card 11 is disposed on the rear plate 10', and the latch 30' lies in an unlocked position as shown in FIG. 8. The locking member 20' is rotated up. The lock clip 213' is inserted through the opening 13' of the rear plate 10', and the shield plate 12 of the expansion card 11 is sandwiched between the locking member 20' and the rear plate 10'. The latch 30' is rotated counter-clockwise until the protrusion of the latch 30' is engaged in the positioning hole 14' of the rear plate 10'. The latch 30' is positioned in a locked position. The cutout 37' of the latch 30' receives the narrow portion 215' of the lock clip 213'. The lock clip 213' is blocked by the latch 30', and cannot be withdrawn from the opening 13'. The expansion card 11 is thus secured to the rear plate 10'.

In removal of the expansion card 11, the latch 30' is driven to disengage the protrusion from the positioning hole 14', and rotated clockwise from the locked position to the unlocked position. The lock clip 213' is released from the cutout 37'. The locking member 20' can thereby be disengaged from the opening 13', and rotated down to release the expansion card 11. Thus, the expansion card 11 can be taken away from the rear plate 10'.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for an expansion card with a shield plate, comprising:
    a rear plate for the shield plate disposed thereon, the rear plate defining an opening therein;
    a locking member attached to the rear plate, the looking member capable of being pivoted to a locked position for clamping the shield plate against the rear plate; and
    a latch attached to the locking member, the latch capable of being inserted through the opening and rotated to abut against the rear plate for keeping the locking member in die locked position;
    wherein a stop tab is disposed on the locking member; the stop tab is inserted through the opening and perpendicular to the rear plate when the latch is rotated to abut against the rear plate, and blocks the latch from excessively rotating.

2. The mounting apparatus as described in claim 1, wherein the rear plate defines a positioning hole above the opening thereof, and a protrusion is formed on the latch for engaging in the positioning hole to locate the latch in the locked position.

3. The mounting apparatus as described in claim 1, wherein a bent portion extends out of the rear plate for the shield plate depending therefrom, and the locking member is pivotably attached to a free edge of the bent portion.

4. The mounting apparatus as described in claim 1 wherein a convex portion is formed on the latch, thereby the latch being capable of rotating once inserted through the opening of the rear plate.

5. A mounting apparatus for an expansion card with a shield plate, comprising:
- a rear plate for the shield plate disposed thereon, the rear plate defining an opening therein;
- a locking member attached to the rear plate, the locking member capable of being pivoted for pressing the shield plate between the locking member and the rear plate, and forming a lock clip corresponding to the opening of the rear plate; and
- a latch attached to the rear plate, the latch capable of being rotated to engage with the lock clip of the locking member after the lock clip inserting through the opening of the rear plate, thereby locating the locking member on the rear plate, for preventing the shield plate releasing between the locking member and the rear plate;
- wherein the lock clip has a narrow portion, and the latch defines a cutout for clamping the narrow portion.

6. The mounting apparatus as described in claim 5, wherein a bent portion extends out of the rear plate for the shield plate depending thereon, and the locking member is pivotably attached to a free edge of the bent portion.

7. The mounting apparatus as described in claim 5, wherein a generally L-shaped locating tab protrudes from the rear plate above the opening, and the latch defines a sliding slot therein for receiving the locating tab and retaining the latch on an inner surface of the rear plate.

8. A mounting apparatus for an expansion card with a shield plate, comprising:
- a rear plate, a bent portion extending from a surface of the rear plate for the shield plate being disposed thereon;
- a locking member pivotably attached to the bent portion of the rear plate for pressing against the shield plate; and
- a latch attached to one of the rear plate and the lacking member, the latch capable of being rotated on an opposite surface of the rear plate above the bent portion, for preventing the shield plate releasing from between the locking member and the rear plate;
- wherein the locking member forms a lock clip for inserting into the opening, and the lock clip has a narrow portion, and the latch defines a cutout for clamping the narrow portion.

9. The mounting apparatus as described in claim 8, wherein the rear plate defines a positioning hole in a side of the opening thereof, and a protrusion is formed on the latch for engaging into the positioning hole to locate the latch in a locked position.

10. The mounting apparatus as described in claim 8, wherein a stop tab is disposed on the locking member for stopping the larch rotating excessively.

11. The mounting apparatus as described in claim 10 wherein a convex portion is formed on the latch, thereby the latch being capable of rotating when inserting through the opening of the rear plate.

12. The mounting apparatus as described in claim 8, wherein a generally L-shaped locating tab protrudes from the rear plate above the opening, and the latch defines a sliding slot therein for receiving the locating tab and retaining the latch on the inner surface of the rear plate.

* * * * *